(12) United States Patent
Jha et al.

(10) Patent No.: US 12,652,223 B2
(45) Date of Patent: Jun. 9, 2026

(54) NETWORK ARCHITECTURE FOR UNIFIED HANDLING OF SERVICES

(71) Applicant: INDIAN INSTITUTE OF TECHNOLOGY BOMBAY, Mumbai (IN)

(72) Inventors: Pranav Kumar Jha, Mumbai (IN); Rashmi Kamran, Mumbai (IN); Shwetha Kiran, Mumbai (IN); Abhay Karandikar, Mumbai (IN); Prasanna S. Chaporkar, Mumbai (IN)

(73) Assignee: INDIAN INSTITUTE OF TECHNOLOGY BOMBAY, Mumbai (IN)

( * ) Notice: Subject to any disclaimer, the term of this patent is extended or adjusted under 35 U.S.C. 154(b) by 35 days.

(21) Appl. No.: 18/773,102

(22) Filed: Jul. 15, 2024

(65) Prior Publication Data

US 2025/0274356 A1 Aug. 28, 2025

(30) Foreign Application Priority Data

Feb. 28, 2024 (IN) .............................. 202421014717

(51) Int. Cl.
*H04L 41/50* (2022.01)
*H04L 49/253* (2022.01)
(52) U.S. Cl.
CPC ............ *H04L 41/50* (2013.01); *H04L 49/253* (2013.01)
(58) Field of Classification Search
CPC .............................. H04L 41/50; H04L 49/253
See application file for complete search history.

(56) References Cited

U.S. PATENT DOCUMENTS

| | | | | |
|---|---|---|---|---|
| 10,560,756 | B2 * | 2/2020 | Aitken | ............. H04N 21/64322 |
| 12,068,958 | B1 * | 8/2024 | Henkel | ................. H04L 41/122 |
| 2016/0105380 | A1 * | 4/2016 | Chhillar | ................ H04L 49/557 |
| | | | | 370/244 |
| 2017/0195257 | A1 * | 7/2017 | Annaluru | .............. H04L 49/253 |
| 2017/0279689 | A1 * | 9/2017 | Mohan | .................... H04L 41/50 |
| 2019/0007280 | A1 * | 1/2019 | Sarangam | ........... H04L 41/5003 |

(Continued)

FOREIGN PATENT DOCUMENTS

| | | | | | |
|---|---|---|---|---|---|
| CN | 105075191 | A * | 11/2015 | ............ | H04W 28/10 |
| ES | 2785385 | T3 * | 10/2020 | .......... | H04W 72/541 |

(Continued)

*Primary Examiner* — Richard G Keehn
(74) *Attorney, Agent, or Firm* — Maschoff Brennan

(57) ABSTRACT

Embodiments herein disclose a modular, scalable, and flexible network architecture which can handle all services in a unified manner, wherein the architecture can handle built-in services in NGNs in a manner similar to application-based services by decoupling the "built-in" service handling from "network control plane" of the networks. Embodiments herein disclose the modular, scalable, and flexible network architecture, wherein the network treats all types of signaling messages as payload or data or service, and the architecture thereof. Embodiments herein disclose the modular, scalable, and flexible network architecture, wherein built-in services (such as, but not limited to, session establishment, registration (network attachment), mobility, authentication, and so on) are moved out of the control plane and as a part of the service/application plane.

7 Claims, 7 Drawing Sheets

(56) References Cited

U.S. PATENT DOCUMENTS

| | | | | |
|---|---|---|---|---|
| 2019/0007500 A1* | 1/2019 | Kim | ...................... | H04L 67/141 |
| 2019/0007992 A1* | 1/2019 | Kim | ...................... | H04W 76/27 |
| 2019/0059067 A1* | 2/2019 | Lee | ...................... | H04W 60/04 |
| 2019/0116486 A1* | 4/2019 | Kim | ........................ | H04W 8/10 |
| 2020/0195521 A1* | 6/2020 | Bogineni | ........... | H04L 41/5022 |
| 2022/0070767 A1* | 3/2022 | Qiao | ..................... | H04W 28/24 |
| 2023/0198827 A1* | 6/2023 | Wu | ...................... | H04L 43/065 |
| | | | | 709/223 |
| 2025/0150166 A1* | 5/2025 | Han | ................... | H04L 41/5041 |

FOREIGN PATENT DOCUMENTS

| | | | | | |
|---|---|---|---|---|---|
| ES | 2906250 T3 * | 4/2022 | ............ | H04W 92/04 |
| TW | 201715910 A * | 5/2017 | .......... | H04L 47/125 |
| TW | I721085 B * | 3/2021 | ............ | H04W 16/02 |
| WO | WO-2016034798 A1 * | 3/2016 | ......... | G06F 9/45533 |
| WO | WO-2018086674 A1 * | 5/2018 | ......... | H04L 41/5051 |

* cited by examiner

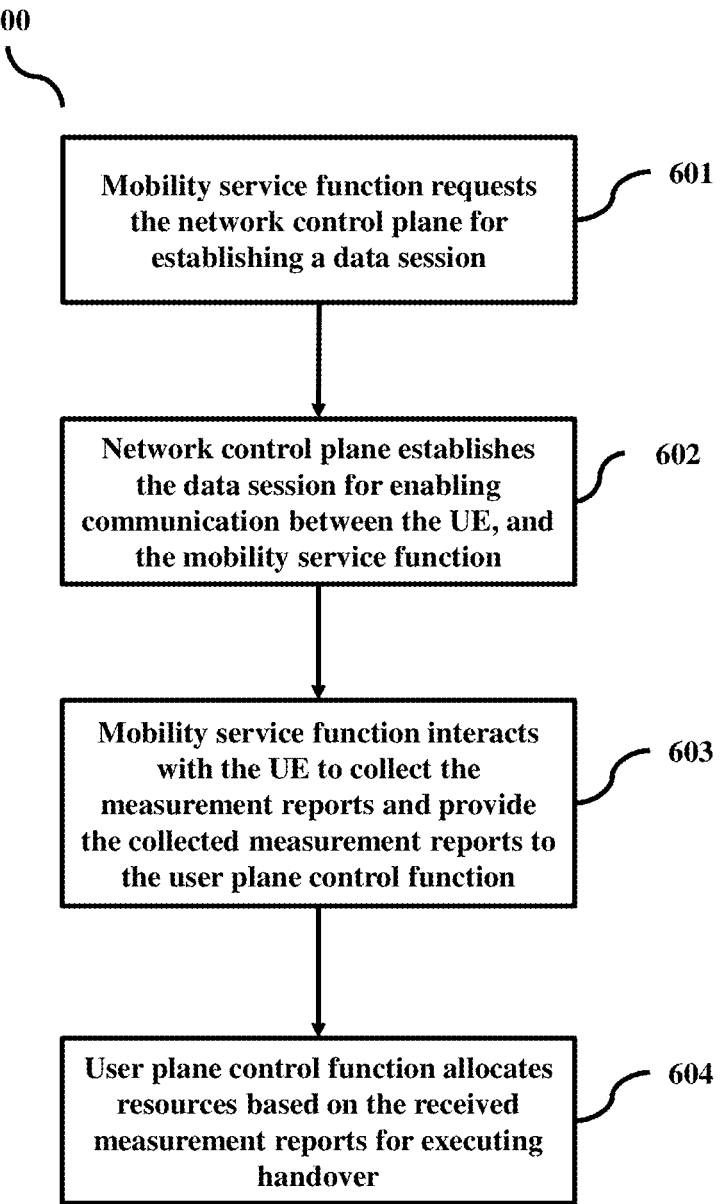

600

601 Mobility service function requests the network control plane for establishing a data session 602 Network control plane establishes the data session for enabling communication between the UE, and the mobility service function 603 Mobility service function interacts with the UE to collect the measurement reports and provide the collected measurement reports to the user plane control function 604 User plane control function allocates resources based on the received measurement reports for executing handover

FIG. 6

NETWORK ARCHITECTURE FOR UNIFIED HANDLING OF SERVICES

TECHNICAL FIELD

Embodiments disclosed herein relate to wireless communication networks, and more particularly to a modular, scalable, and flexible network architecture which can handle all services in a unified manner.

BACKGROUND

Existing telecommunications networks, such as fixed-line broadband networks or cellular broadband networks, provide a wide range of telecommunications services to end users. Some example services are web-based services, video streaming service, Internet Protocol Television (IPTV) service, or gaming service. Both the fixed-line and cellular broadband networks are categorized as Next Generation Networks (NGN) in International Telecommunication Union (ITU)'s terminology. NGNs are packet-based broadband networks typically utilizing more than one QoS-enabled transport technologies to provide telecommunications services to users. A key characteristic of NGN is that service delivery functions are independent of underlying transport network technologies. The NGN may contain a variety of Application Functions/Servers to support the end user services such as video streaming service or IPTV service. These Application Servers are independent functions, decoupled from the transport stratum of the network (NGN). They access the control functions of the transport stratum (called network control functions or network control plane functions) over a standardized interface to eventually enable service delivery to end users through the transport functions (also called the user plane).

In addition, to these application-based services there are some intrinsic (built-in) services offered by NGNs. User mobility support is an example of such a built-in service, which enables a mobile user/entity to communicate and access services irrespective of the changes in its location. It one of the key services offered by cellular broadband networks but such services are not always apparent to the end-user. The two categories of services (application-based services and built-in services) are enabled differently in existing networks. The delivery of built-in services is tightly integrated within the network control plane of the NGN.

Existing NGN architectures, which include both cellular and fixed-access broadband networks, provide some built-in services to network users, such as, but not limited to, registration (network attachment), authentication, data session establishment, mobility, and so on. Enabling these built-in services requires exchange of signaling messages with end user devices or User Equipment (UE). The existing network control functions (Control Plane (CP)) in NGN are responsible for exchange of these signaling messages with UEs for these built-in services. In addition to the exchange of signaling messages with UEs, the existing CP functions are also responsible for controlling the User Plane (UP) functions (transport functions), which essentially translates into establishment, modification, or deletion of data sessions over the UP functions (transport functions). Both these two categories of functionalities "Signaling exchange or handling (or control)" and "User plane control" are tightly coupled within the control plane of existing networks.

On the other hand, application-based services provided by an Application Provider are enabled in a different manner than these built-in services in existing NGNs. Application-based services are supported with the help of Application Functions (AF). The AF is typically an entity external to the network. The AF interacts with the network via standardized interfaces, with the CP and the UP. The AF interacts with the network (NGN) CP to setup a data session via the NGN UP. Once the data session via UP is established, the AF sends data to the UP to be forwarded subsequently to the user for service delivery. An important point to note here is that the AF may also need to interact with the end user (signaling exchange) before setting up the data sessions through NGN. This signaling message exchange between the end user and the AF provides the requirements to the AF for the data session to be established later (via the network user plane) to deliver the service to the UEs. Besides, the initial signaling exchange between the UE and the AF also takes place over a data session established earlier, similar to the delivery of service via data session later, i.e., the NGN treats both the signalling exchange between the AF and the user and the subsequent service delivery to the user as data. It should also be noted that the AF itself cannot set up the data session through the network but requests the network's control plane through a standardized interface to set up the session through the network's user plane. A similar flow is observed in many other services such as IP Multimedia Subsystem (IMS) services.

While the Application provider AF is decoupled from the NGN and accesses it (NGN) via standardized interfaces to support the service delivery, the delivery of built-in services is tightly integrated within the control plane of the existing NGN architecture.

For future wireless communication networks, a tight coupling between the "built-in service" and the "network control" functionalities in control plane may not be desirable. Further, in future wireless communication networks, it has not been defined as to which entity(ies) in the control plane should handle the signaling exchange (information exchange) with UEs for enabling built-in services, and should the functions (or components) responsible for signaling exchange with UEs be cleanly separated from the network control functionality by making them a part of built-in service functions (for example, AFs Hence, there is a need in the art for solutions which will overcome the above mentioned drawback(s), among others.

OBJECTS

The principal object of embodiments herein is to disclose a modular, scalable, and flexible network architecture which can handle all services in a unified manner, wherein the architecture can handle built-in services in NGNs in a manner similar to application-based services by decoupling the "built-in" service handling from "network control plane" of the networks.

Another object of embodiments herein is to disclose the modular, scalable, and flexible network architecture, wherein the network treats all types of signaling messages as payload or data or service, and the architecture thereof.

Another object of embodiments herein is to disclose the modular, scalable, and flexible network architecture, wherein built-in services (such as, but not limited to, session establishment, registration (network attachment), mobility, authentication, and so on) are moved out of the control plane and as a part of the service/application plane.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

Embodiments herein are illustrated in the accompanying drawings, throughout which like reference letters indicate corresponding parts in the various figures. The embodiments herein will be better understood from the following description with reference to the following illustratory drawings. Embodiments herein are illustrated by way of examples in the accompanying drawings, and in which:

FIG. 6 is a flowchart depicting an example process of managing mobility in the network, according to embodiments as disclosed herein.

DETAILED DESCRIPTION

Figure 1A:
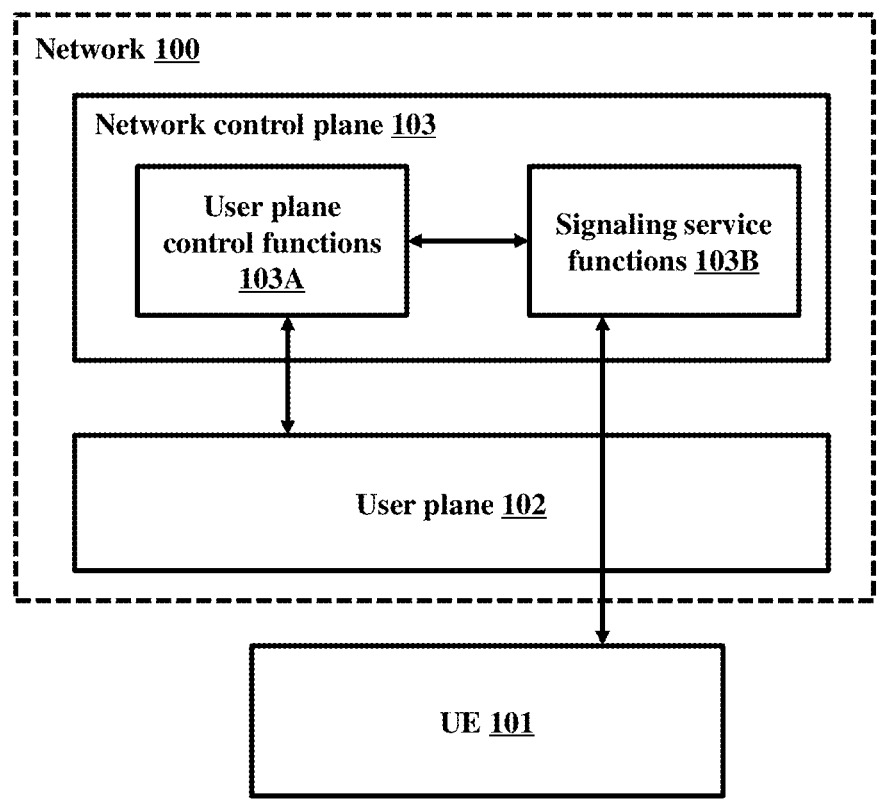
FIGS. 1A and 1B depict network architectures, wherein the user plane is decoupled from network control plane, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

For the purposes of interpreting this specification, the definitions (as defined herein) will apply and whenever appropriate the terms used in singular will also include the plural and vice versa. It is to be understood that the terminology used herein is for the purposes of describing particular embodiments only and is not intended to be limiting. The terms "comprising", "having" and "including" are to be construed as open-ended terms unless otherwise noted.

The words/phrases "exemplary", "example", "illustration", "in an instance", "and the like", "and so on", "etc.", "etcetera", "e.g.,", "i.e.," are merely used herein to mean "serving as an example, instance, or illustration." Any embodiment or implementation of the present subject matter described herein using the words/phrases "exemplary", "example", "illustration", "in an instance", "and the like", "and so on", "etc.", "etcetera", "e.g.,", "i.e.," is not necessarily to be construed as preferred or advantageous over other embodiments.

Embodiments herein may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits, and the like, and may optionally be driven by a firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

It should be noted that elements in the drawings are illustrated for the purposes of this description and ease of understanding and may not have necessarily been drawn to scale. For example, the flowcharts/sequence diagrams illustrate the method in terms of the steps required for understanding of aspects of the embodiments as disclosed herein. Furthermore, in terms of the construction of the device, one or more components of the device may have been represented in the drawings by conventional symbols, and the drawings may show only those specific details that are pertinent to understanding the present embodiments so as not to obscure the drawings with details that will be readily apparent to those of ordinary skill in the art having the benefit of the description herein. Furthermore, in terms of the system, one or more components/modules which comprise the system may have been represented in the drawings by conventional symbols, and the drawings may show only those specific details that are pertinent to understanding the present embodiments so as not to obscure the drawings with details that will be readily apparent to those of ordinary skill in the art having the benefit of the description herein.

The accompanying drawings are used to help easily understand various technical features and it should be understood that the embodiments presented herein are not limited by the accompanying drawings. As such, the present disclosure should be construed to extend to any modifications, equivalents, and substitutes in addition to those which are particularly set out in the accompanying drawings and the corresponding description. Usage of words such as first, second, third etc., to describe components/elements/steps is for the purposes of this description and should not be construed as sequential ordering/placement/occurrence unless specified otherwise.

The embodiments herein achieve a modular, scalable, and flexible network architecture which can handle all services in a unified manner. Referring now to the drawings, and more particularly to FIGS. 1 through 6, where similar reference characters denote corresponding features consistently throughout the figures, there are shown embodiments.

Embodiments herein decouple the control plane functionalities and support the built-in services similar to the support for external AF based services. Though currently tightly coupled within the control plane of the existing networks, embodiments herein consider the categories of functionalities (i.e., "signaling exchange (or handling)" and "user plane control") as logically separate functionalities. Once separated, they may interact via a standardized interface. decoupling the control plane functionalities can result in a modular, scalable, and flexible architecture, which can be used in wireless communication networks.

Embodiments herein disclose an evolved network architecture, wherein in the architecture, the "user plane control functionality" is decoupled from the "signaling handling/control functionality". Further, by treating UE-associated signaling (for built-in services) as a service, embodiments herein define a service-driven architecture for wireless communication networks, where all services are handled in a uniform manner, irrespective of whether the services are built-in services (such as, but not limited to, authentication or user mobility), or external services (such as, but not limited to, media streaming or IMS services).

Figure 1B:
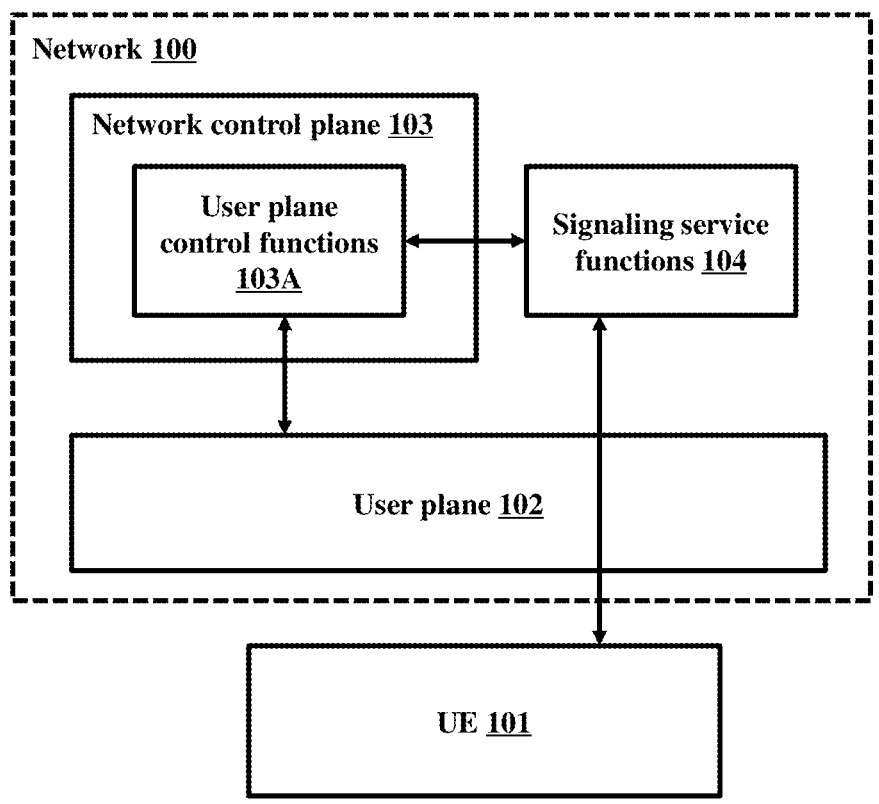
Figure 3:
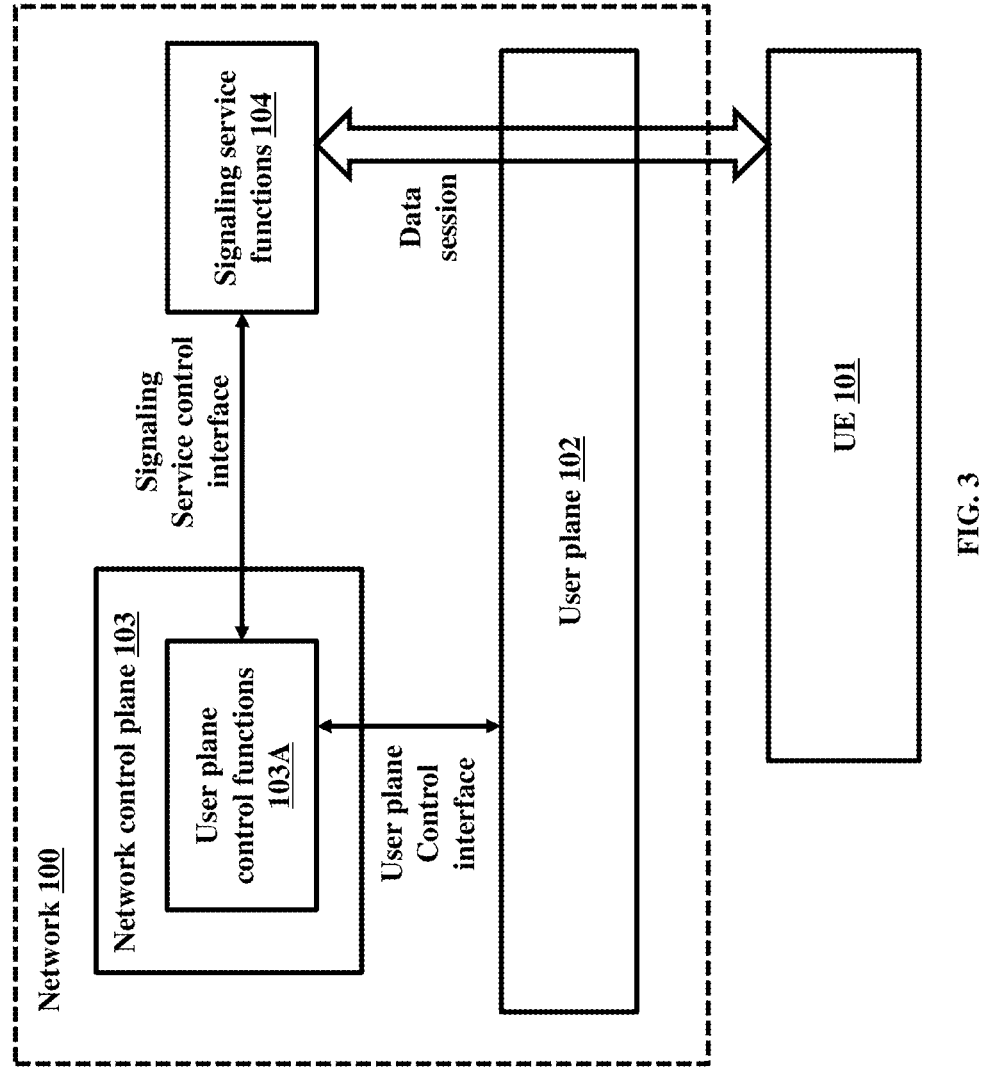
FIG. 3 depicts example interfaces in the network, according to embodiments as disclosed herein.

FIGS. 1A and 1B depict network architectures, wherein the user plane is decoupled from network control plane. The network 100, as depicted, comprises a user plane 102, and a network control plane 103. In an embodiment herein, the network control plane 103, as depicted in FIG. 1A, comprises one or more user plane control functions 103A, and one or more signaling service functions 103B. In an embodiment herein, the network control plane 103, as depicted in FIG. 1B, comprises one or more user plane control functions 103A. Further, as depicted in FIG. 1B, the network 100 comprises one or more separate signaling service functions (also referred to herein as Application Functions (AFs)) 104, which can be separate from the network control plane 103. The signaling service functions 104 can handle exchange of signaling messages with at least one User Equipment (UE) 101. The signaling service functions 104 can also interact with the user plane control functions 103A to enable one or more built-in services. The signaling service functions 104 are separate from the network control plane 103, and can communicate with the network control plane 103, via standardized application-control interface(s) (as depicted in FIG. 3).

The network control plane 103 can handle UE signaling via an application function (service function) 103B. The network control plane 103 can treat the UE signaling messages as a form of data flowing through the network 100. Consider that a set of functionalities for the network control plane 103 involves controlling and managing user-plane entities (i.e., management of data sessions (data paths) in the user plane), which can be decoupled as the user plane control functions 103A.

The signaling service functions 103B, 104 can comprise of one or more functionalities, responsible for either directly providing or enabling the built-in services. The signaling service functions 103B, 104 can exchange signaling messages with UEs 101 to provide direct services such as, but not limited to, authentication service(s). These functions are other than those included as part of user plane control functions 103A.

The enabling of certain services may also require interaction between the user plane control functions 103A, and the signaling service functions 103B, 104. For example, in order to provide the data session connectivity service to a UE 101, the signaling service functions 103B, 104 may communicate with a UE 101 to collect the requirements for the data session and request the user plane control functions 103A to setup the data session through the user plane functions 103A.

A network service delivery architecture (as shown in FIG. 1B) can employ one or more signaling functions as built-in service functions. The proposed architecture can facilitate uniform handling of services (built-in and/or external services). The handling of a service to the UE 101 may involve two steps; the collection of service requirements, and establishment of a path for service access using one or more interfaces. Collecting service-related requirements from a user can involve establishment of a path through the network 100. The user plane control functions 103A can enable communication between the UE 101 and the signalling service functions 103B, 104. Examples of the signaling service functions 104 can be, but not limited to, PDU session service(s), mobility service(s), registration service(s), authentication service(s), and other services. The signaling service functions 103A, 104 can support one or more functions/services directly via exchange of signaling messages with the UEs 101 and also enable other services (such as, but not limited to, data transfer or user mobility) by collecting relevant information (requirements) from the UEs 101 through signaling exchange and providing the information to the network control plane 103 to be used further for configuration of the user plane functions 103A in order to support the appropriate service-aware behavior. Once decoupled, the signaling service functions 103B, 104 can also be treated like external application-based services. Similar to an application service-based architecture for service delivery, signaling related to a built-in service can be exchanged with the UE 101 over a data path (i.e., a signaling path) by one or more signaling service functions 103B, 104. The user plane control functions 103A can interact only with the signaling service functions 103B, 104 (and not with the UE 101 directly) and can establish the required data path for a service (such as, but not limited to, data session connectivity service, mobility, and so on).

Figure 2:
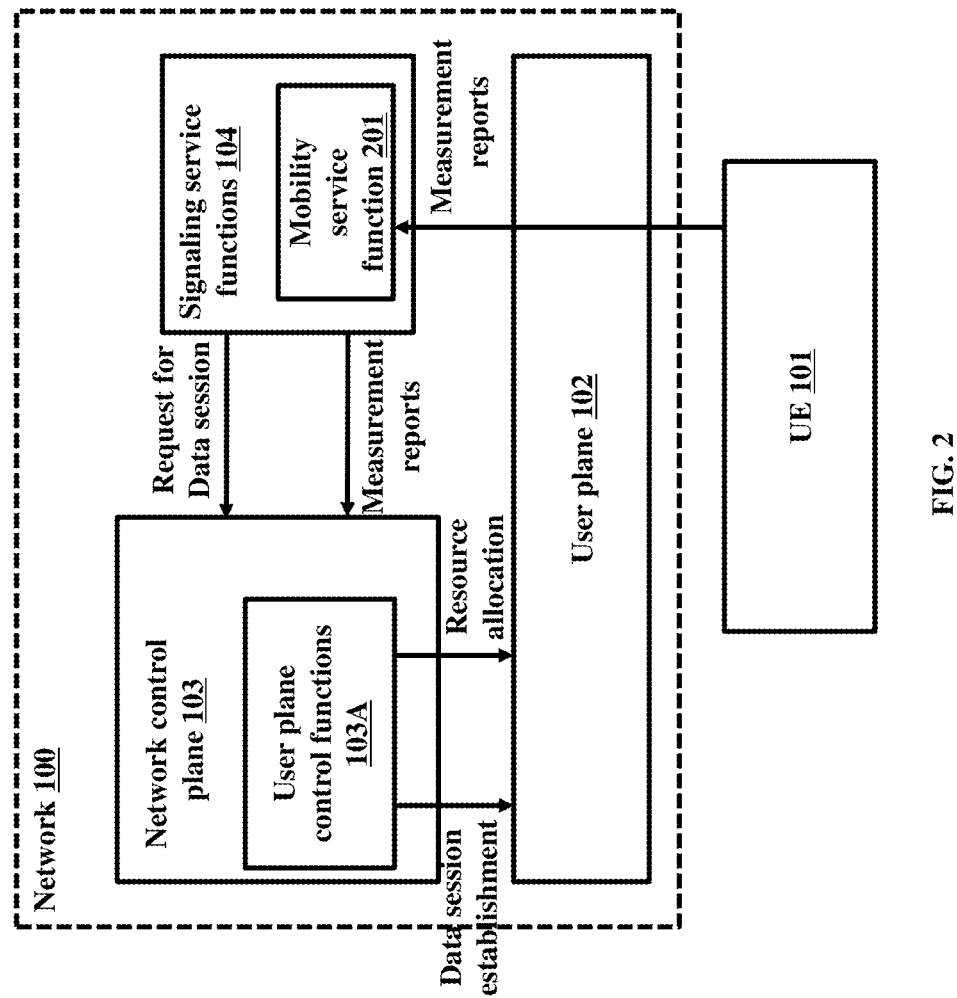
FIG. 2 depicts an example network architecture, wherein the network is provisioned with mobility as a built-in-service, according to embodiments as disclosed herein.

FIG. 2 depicts an example network architecture, wherein the network is provisioned with mobility as a built-in-service. One or more interactions between the UE 101 and a mobility service function 201 (an example of a signaling service function 103B, 104) may be required to support the mobility service; for example, when the UE 101 is moving from one base station (source base station) to another base station (target base station). The mobility service function 201 can request the network control plane 103 for establishing a data session, and the network control plane 103 can establish the data session for enabling communication between the UE 101, and the mobility service function 201. The mobility service function 201 can interact with the UE 101 to collect the measurement reports and provide the collected measurement reports to the user plane control function 103A for establishing data sessions on the target base station along with teardown of data session on the source base station. Further, the mobility service function 201 can collect information from the UE 101 through this data session.

FIG. 3 depicts example interfaces in the network. There can be a signaling service control interface between one or more signaling service functions 104, and the network control plane 103. The signaling service functions 104 can facilitate control signaling related to data session establishment request, and UE associated information transfer for built-in services for signaling service function. A user plane control interface can be an interface between the user plane control functions 103A, and the user plane 102. The user plane control interface can be a simplified user plane control interface, as signaling handling functionality is now decoupled from the user plane control functionality. The user plane control interface can facilitate control signaling related to only user plane control functions 103A.

Figure 4:
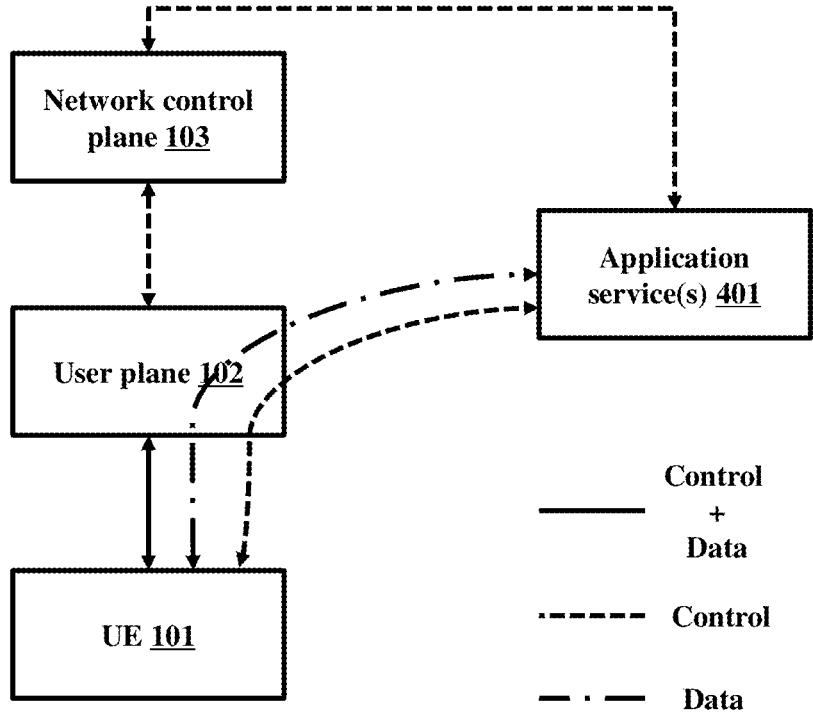
FIG. 4 is an example scenario depicting the operation of interfaces between an external application service provider and the network, according to embodiments as disclosed herein.

FIG. 4 is an example scenario depicting the operation of interfaces between an external application service provider and the network. Consider that an application service 401 is served in the network 100. The application service 401 can interact with the network 100 (the user plane control functions 103A, and the signaling service functions 103B, 104), via one or more standardized interfaces. For content delivery, a provider of the application service 401 can send the data to the user plane to be forwarded to the end-users (i.e., UEs). The application service 401 can also interact with the network control plane 103 via the signaling service control interface for the establishing the data session through the network to be used for data delivery. As the provider of the application service 401 is decoupled from the network 100 and the provider of the application service 401 accesses the network 100 via standardized interfaces to support the service delivery, the delivery of built-in services also can be handled in a similar manner.

Figure 5:
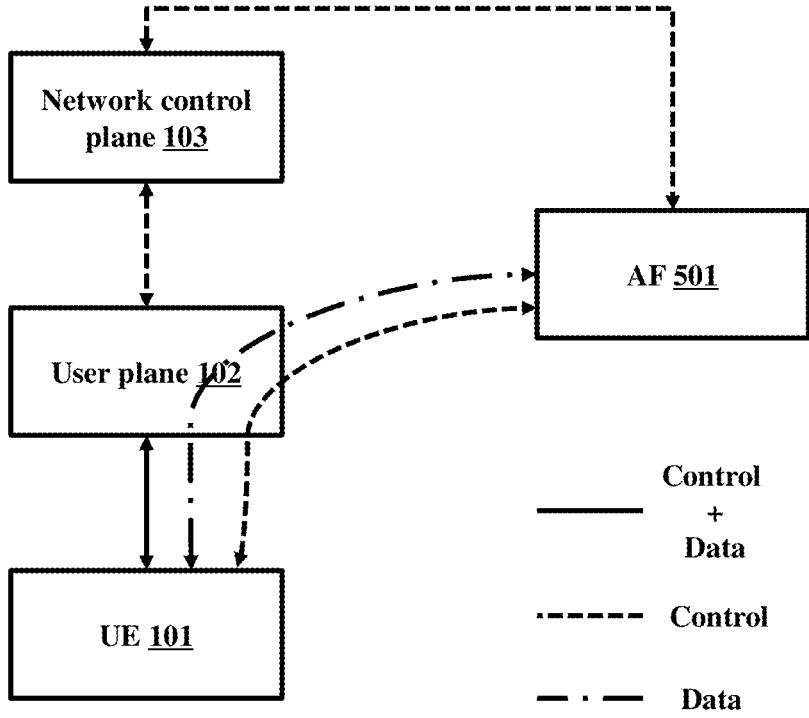
FIG. 5 is an example scenario depicting the operation of interfaces between an AF and the network, according to embodiments as disclosed herein.

In an example herein (as depicted in FIG. 5), consider that the application service 401 is an Application Function (AF) 501. The AF 501 may need to interact with the UEs before setting up the data sessions. This signaling message exchange between the UE 101 and the AF 501 can provide the requirements to the AF 501 for the data session to be established later (via the network 100) to deliver the service to the UEs 101. The initial signaling exchange between the UE 101 and the AF 501 can also take place over an earlier established data session, similar to the delivery of content via a later data session. The AF 501 cannot set up the data session through the user plane 102 of the network 100, but requests the control plane 102 through a standardized interface to set up the session through the user plane 102.

FIG. 6 is a flowchart depicting an example process of managing mobility in the network. Consider a mobility service function 201 as an example of a signaling service function 103B, 104. Further, consider that the UE 101 is moving from the source base station to the target base station. In step 601, the mobility service function 201 requests the network control plane 103 for establishing a data session. In step 602, the network control plane 103 establishes the data session for enabling communication between the UE 101, and the mobility service function 201. In step 603, the mobility service function 201 interacts with the UE 101 to collect the measurement reports and provides the collected measurement reports to the user plane control function 103A for establishing data sessions on the target base station along with teardown of data session on the source base station. Further, the mobility service function 201 collects information from the UE 101 through this data session. In step 604, the user plane control function 103A allocates resources based on the received measurement reports for executing handover. The various actions in method 600 may be performed in the order presented, in a different order or simultaneously. Further, in some embodiments, some actions listed in FIG. 6 may be omitted.

The embodiments disclosed herein can be implemented through at least one software program running on at least one hardware device and performing network management functions to control the network elements. The elements include blocks which can be at least one of a hardware device, or a combination of hardware device and software module.

The embodiment disclosed herein describes a modular, scalable, and flexible network architecture which can handle all services in a unified manner. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g., Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the invention may be implemented on different hardware devices, e.g., using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments and examples disclosed herein can be practiced with modification within the scope of the embodiments as described herein.

We claim:

1. A wireless communication network, the network comprises:

a user plane;

a network control plane, wherein the network control plane is decoupled from the user plane; and at least one signaling service function, wherein the network is configured to handle services irrespective of whether the services are built-in services, or external application-based services, by collecting one or more service requirements and establishing a path for service access through the user plane using at least one standardized interface, wherein the at least one signaling service function is configured to handle exchange of signaling messages with at least one User Equipment as a form of data flowing through the wireless communication network, via the user plane.

2. The wireless communication network, as claimed in claim 1, wherein the network control plane comprises at least one user plane control function.

3. The wireless communication network, as claimed in claim 2, wherein the network control plane further comprises the at least one signaling service function.

4. The wireless communication network, as claimed in claim 2, wherein the network control plane is separate from the at least one signaling service function.

5. The wireless communication network, as claimed in claim 1, wherein the at least one signaling service function is configured to directly provide at least one built-in service selected from one or more of session establishment, registration, mobility, or authentication.

6. The wireless communication network, as claimed in claim 1, wherein the at least one signaling service function is configured to:

collect relevant information from at least one UE through signaling exchange; and provide the collected information to the network control plane.

7. The wireless communication network, as claimed in claim 6, wherein the network control plane is configured to:

use the provided information for configuration of the at least one user plane control function to support service-aware behavior for services including one or more of session establishment, registration, mobility, or authentication.

* * * * *